(12) United States Patent
Kaga et al.

(10) Patent No.: US 8,733,922 B2
(45) Date of Patent: May 27, 2014

(54) PRINT PREPARATION METHOD

(75) Inventors: Makoto Kaga, Hachioji (JP); Hirotaka Iijima, Hachioji (JP)

(73) Assignee: Konica Minolta Holdings, Inc. (JP)

( * ) Notice: Subject to any disclaimer, the term of this patent is extended or adjusted under 35 U.S.C. 154(b) by 17 days.

(21) Appl. No.: 13/641,615

(22) PCT Filed: Apr. 11, 2011

(86) PCT No.: PCT/JP2011/058986
§ 371 (c)(1),
(2), (4) Date: Oct. 16, 2012

(87) PCT Pub. No.: WO2011/136009
PCT Pub. Date: Nov. 3, 2011

(65) Prior Publication Data
US 2013/0038668 A1    Feb. 14, 2013

(30) Foreign Application Priority Data

Apr. 28, 2010 (JP) ................... 2010-103248

(51) Int. Cl.
*B41J 2/01* (2006.01)
*G01D 11/00* (2006.01)
(52) U.S. Cl.
USPC .......................................... 347/102; 347/100
(58) Field of Classification Search
USPC ................................. 347/100, 102
See application file for complete search history.

(56) References Cited

U.S. PATENT DOCUMENTS 8,061,830 B2 * 11/2011 Makuta et al. ................. 347/100
8,398,228 B2 * 3/2013 Nakamura ..................... 347/102

FOREIGN PATENT DOCUMENTS

JP    2006-56199 A    3/2006

OTHER PUBLICATIONS

International Search Report for International application No. PCT/JP2011/058986 mailing date of Jun. 28, 2011 with English translation.

* cited by examiner

*Primary Examiner* — Anh T. N. Vo
(74) *Attorney, Agent, or Firm* — Cantor Colburn LLP

(57) ABSTRACT

Provided is a print preparation method possessing an ejection step in which liquid drops of actinic energy radiation curable type ink-jet ink each containing a polymerizable compound, a photo-polymerizable initiator and a gelling agent are injected from an ink-jet recording head to supply the actinic energy radiation curable type ink-jet ink onto a recording medium, and an actinic energy radiation exposure step, wherein the print preparation method further comprises step (A) in which the recording medium is exposed to electromagnetic waves having a longer wavelength than a wavelength of an absorption wavelength of the photo-polymerization initiator contained in the actinic energy radiation curable type ink-jet ink from a side of a surface on which the image is formed, before conducting the actinic energy radiation exposure step, the print preparation method by which a print having images exhibiting excellent image wear resistance, gloss evenness and image density evenness is provided.

4 Claims, No Drawings

PRINT PREPARATION METHOD

CROSS REFERENCE TO RELATED APPLICATIONS

This is a U.S. national stage of application No. PCT/JP2011/058986, filed on 11Apr. 2011. Priority under 35 U.S.C. §119(a) and 35 U.S.C. §365(b) is claimed from Japanese Application No. 2010-103248, filed 28 Apr. 2010, the disclosure of which are also incorporated herein by reference.

TECHNICAL FIELD

The present invention relates to a method to form images each on a recording medium as a printed material via an ink-jet method employing actinic energy radiation curable ink, and relates specifically to a print preparation method capable of exhibiting excellent image wear resistance, gloss evenness and image density evenness.

BACKGROUND

As to an ink-jet recording method, high-resolution images are possible to be recorded by a relatively simple apparatus, and the ink-jet image forming method has been rapidly in progress in various fields. Further, there are a wide range of applications to be utilized, and a recording medium or ink suitable for each purpose is employed.

Specifically, in recent years, recording speed has been largely increased, and printers each having convenience printing-strength properties have been developed.

In the case of this ink-jet recording system, ink is ejected from an ink-jet head, and deposited onto a recording medium to form images. The ink should exhibit low viscosity in order to eject the ink from the ink-jet head. On the other hand, high viscosity ink is demanded in order to prevent color mixing called bleed generated since plural kinds of ink each exhibiting different color are deposited on the recording medium.

As a method to solve this dilemma, a UV radiation curable ink-jet technique employing actinic energy radiation curable ink is practically utilized. This is a technique by which an actinic energy radiation curable monomer and a photo-polymerization initiator are added into ink, and the resulting one is exposed to actinic energy radiation after depositing it onto a recording medium to cure the ink, resulting in achievement of a good balance between acquisition of an ejection property and prevention of bleed.

On the other hand, as a technique to suppress bleed, there is an image forming method employing so-called hot-melt ink wherein the hot-melt ink is generally present as a solid phase, but is present at a high operation temperature of an ink-jet printing apparatus as a liquid phase, disclosed in Japanese Patent Document O.P.I. (Open to Public Inspection) Publication No. 2007-154188 and Japanese Patent Document O.P.I. Publication No. 2007-154189. In the case of this hot-melt ink system, when depositing ink-droplets on the surface of a recording material, they are rapidly solidified with no expansion of the recording material in the direction of the area, whereby high resolution images can be formed. Since actinic energy radiation curable ink as well as hot-melt ink does not contain a solvent in an ink component, images can be formed on a recording material exhibiting no ink absorption.

Further, disclosed is a technique by which a gelation action-producing material is contained in an actinic energy radiation curable ink component via temperature change in order to improve dot gain and glossiness, and images are formed via the temperature change and exposure to actinic energy radiation after ink ejected from an ink head is deposited on a recording material (refer to Patent Document 1).

Further, examples of an image forming method employing this ink include a technique by which heat-pressure is applied after printing, followed by exposure to UV rays (refer to Patent Document 2), and another technique of specifying time that elapses before exposure to UV rays after injecting ink in order to specify dot size and dot height after depositing the ink (Patent Document 3).

Among these, as to the technique described in Patent Document 2, for example, when heat pressure was applied after forming images, followed by exposure to UV rays, dot height to form images was suppressed, whereby the effect of resolving uncomfortable feeling of gloss was able to be confirmed, but there appeared a problem such that when cleaning was to be periodically done since members such as rollers used for fixing were contaminated via repetitive fixing thereof, so that the roller surface was scratched during operation, concavity and convexity thereof were transferred to the image surface, resulting in deterioration of image quality. Also, as to the case of a printing system in which an intermediate transfer medium is used, this phenomenon similarly produces a facing problem.

Further, as described in a document such as "Thermal Effect on the penetration of an ink droplet onto a porous medium (Masosheng Ren, Herman Wijshoff, $5^{th}$ European thermal-Science Conference, The Netherlands, 2008)" the technique described in Patent Document 3 was insufficient to dissolve unevenness of image gloss by suppressing elevation of the image, since a much shorter period of time than 100 ms was only to be consumed until a liquid droplet temperature fell at a temperature around room temperature after high-temperature hot melt ink was ejected from an ink-jet head, and deposited onto a recording medium.

Accordingly, in the case of the above-described conventional technique in which UV curable ink containing a gelling agent is used, there often appeared the following problems: problems such that the resulting image exhibited insufficient intensity; evenness of image gloss was insufficient; and image density evenness specifically in a solid image among images was insufficient.

PRIOR ART DOCUMENT

Patent Document

Patent document 1: Japanese Patent O.P.I. Publication No. 2005-255821

Patent document 2: Japanese Patent No. 4231828

Patent document 3: Japanese Patent O.P.I. Publication No. 2003-145914

DISCLOSURE OF THE INVENTION

Problems to be Solved by the Invention

The present invention has been made on the basis of the above-described problems, and it is an object of the present invention to provide a print preparation method by which a print having images each exhibiting excellent image wear resistance, gloss evenness and image density evenness is provided.

Means to Solve the Problems

The above-described object of the present invention is accomplished by the following structures.

(Structure 1) A print preparation method comprising an ejection step in which liquid drops of actinic energy radiation curable type ink-jet ink each containing a polymerizable compound, a photo-polymerizable initiator and a gelling agent are injected from an ink-jet recording head to supply the actinic energy radiation curable type ink-jet ink onto a recording medium, and an actinic energy radiation exposure step in which the actinic energy radiation curable type ink-jet ink having been ejected onto the recording medium is exposed actinic energy radiation to form an image, wherein the print preparation method further comprises step (A) in which the recording medium is exposed to electromagnetic waves having a longer wavelength than a wavelength of an absorption wavelength of the photo-polymerization initiator contained in the actinic energy radiation curable type ink-jet ink from a side of a surface on which the image is formed, before conducting the actinic energy radiation exposure step.

(Structure 2) The print preparation method of Structure 1, wherein the step (A) is conducted after the ejection step.

(Structure 3) The print preparation method of Structure 1 or 2, wherein the electromagnetic waves comprise far-infrared rays.

(Structure 4) The print preparation method of any one of Structures 1-3, wherein the gelling agent comprises fatty acid ester or ketone wax having a melting point of 40-100° C.

Effect of the Invention

The above-described structures can provide a print preparation method by which prints having images each exhibiting excellent image wear resistance, gloss evenness and image density evenness caused by less liquid migration are given.

DESCRIPTION OF THE PREFERRED EMBODIMENTS

In the present invention, disclosed is a print preparation method possessing an ejection step in which liquid drops of actinic energy radiation curable type ink-jet ink each containing a polymerizable compound, a photo-polymerizable initiator and a gelling agent are injected from an ink-jet recording head to supply the actinic energy radiation curable type ink-jet ink onto a recording medium, and an actinic energy radiation exposure step in which the actinic energy radiation curable type ink-jet ink having been ejected onto the recording medium is exposed actinic energy radiation to form an image, wherein the print preparation method further possesses step (A) in which the recording medium is exposed to electromagnetic waves having a longer wavelength than a wavelength of an absorption wavelength of the photo-polymerization initiator contained in the actinic energy radiation curable type ink-jet ink from a side of a surface on which the image is formed, before conducting the actinic energy radiation exposure step.

Specifically in the present invention, a print preparation method by which prints having images each exhibiting excellent image wear resistance, gloss evenness and image density evenness caused by less liquid migration are given can be provided by exposing the recording medium to electromagnetic waves having a longer wavelength than a wavelength of an absorption wavelength of the photo-polymerization initiator contained in the actinic energy radiation curable type ink-jet ink from the side of a surface on which the image is formed, before conducting the actinic energy radiation exposure step.

(Ejection Step)

In the ejection step, liquid drops of actinic energy curable type ink-jet ink containing a polymerizable compound, a photo-polymerization initiator and a gelling agent are injected from an ink-jet head to supply the actinic energy radiation curable type ink-jet ink on a recording medium.

(Actinic Energy Radiation Curable Type Ink-Jet Ink)
(Polymerizable Compound)

The polymerizable compound of the present invention is a compound which is polymerizable from a photo-polymerization initiator of the present invention, and can be selected from a radical polymerizable compound and a cationic polymerizable compound.

The radical polymerizable compound is a compound having a radically polymerizable ethylenically unsaturated bond; can be any compound as long as it is a compound having at least one radically polymerizable ethylenically unsaturated bond in the molecule; and includes a chemical form such as a monomer, an oligomer, a polymer or the like. The radical polymerizable compound may be used singly, or may be used in combination with at least 2 kinds at any ratio in order to improve an intended property.

Examples of the compound having a radically polymerizable ethylenically-unsaturated bond include unsaturated acids and salts thereof such as an acrylic acid, a methacrylic acid, an itaconic acid, a crotonic acid, an isocrotonic acid, a maleic acid and so forth; esters; urethanes; amides and anhydrides thereof; acrylonitrile; styrene, and further, various kinds of radically polymerizable compounds such as unsaturated polyester, unsaturated polyether, unsaturated polyamide and unsaturated urethane.

Specific examples thereof include acrylic acid derivatives such as 2-ethylhexyl acrylate, 2-hydroxyethyl acrylate, butoxyethyl acrylate, carbitol acrylate, cyclohexyl acrylate, tetrahydrofurfuryl acrylate, benzyl acrylate, bis(4-acryloxypolyethoxyphenyl)propane, neopentylglycol diacrylate, 1,6-hexanediol diacrylate, ethylene glycol diacrylate, diethylene glycol diacrylate, triethylene glycol diacrylate, tetraethylene glycol diacrylate, polyethylene glycol diacrylate, polypropylene glycol diacrylate, pentaerythritol triacrylate, pentaerythritol tetraacrylate, dipentaerythritol tetraacrylate, trimethylolpropane triacrylate, tetramethylolmethane tetraacrylate, oligoester acrylate, N-methylol acrylamide, diacetone acrylamide, epoxy acrylate and so forth; methacrylic acid derivatives such as methyl methacrylate, n-butyl methacrylate, 2-ethylhexyl methacrylate, lauryl methacrylate, allyl methacrylate, glycidyl methacrylate, benzyl methacrylate, dimethylaminomethyl methacrylate, 1,6-hexanediol dimethacrylate, ethylene glycol dimethacrylate, triethylene glycol dimethacrylate, polyethylene glycol dimethacrylate, polypropylene glycol dimethacrylate, trimethylolethane trimethacrylate, trimethylolpropane trimethacrylate, 2,2-bis(4-methacryloxypolyethoxyphenyl)propane and so forth; and in addition, allyl compound derivatives such as allyl glycidyl ether, diallyl phthalate, triallyl trimellitate and so forth. Further, usable are radically polymerizable and cross-linkable monomers, oligomers and polymers known in the industry or commercially available products described in "Handbook of Crosslinking Agents" edited by Shinzo Yamashita (published by Taisei Sha in 1981); "UV•EB curing Handbook (Raw material edition)" edited by Kiyoshi Kato (published by Kohbunshi Kanko Kai in 1985); "Application and Market of UV•EB Curing Technology" edited by Rad Tech Japan, page 79 (published by CMC in 1989); "Handbook of Polyester Resins" written by Eiichiro Takiyama (published by Nikkan Kogyo Shimbun Ltd. in 1988), and so forth.

The addition amount of the above-described radically polymerizable compound is preferably 1-97% by weight, and more preferably 30-95% by weight.

Examples of the cationically polymerizable compound include epoxy compounds, oxetane compounds, vinyl ether compounds and so forth.

[Epoxy Compound]

Any of monomers, oligomers and polymers used as an epoxy resin is conventionally usable for an epoxy compound. Specific examples thereof include commonly known aromatic epoxide, alicyclic epoxide and aliphatic epoxide. In addition, the epoxide means a monomer or an oligomer thereof These compounds may be used singly or in combination with at least 2 kinds thereof The aromatic epoxide is preferably di- or polyglycidyl ether prepared via reaction of a polyphenol having at least one aromatic nucleus or an alkylene oxide adduct thereof with epichlorohydrin, and examples thereof include di- or polyglycidyl ether of bisphenol A or an alkylene oxide adduct thereof; di- or polyglycidyl ether of hydrogenated bisphenol A or an alkylene oxide adduct thereof; a novolac-type epoxy resin; and so forth. Herein, as the alkylene oxide, ethylene oxide, propylene oxide or the like can be cited.

The alicyclic epoxide is preferably a compound containing cyclohexene oxide or cyclopentene oxide obtained by epoxidizing a compound having at least one cycloalkane ring such as a cyclohexene or cyclopentene ring with a suitable oxidant such as hydrogen peroxide, a peracid or the like. Specific examples thereof include Celloxide 2021, Celloxide 2021A, Celloxide 2021P, Celloxide 2080, Celloxide 2000, Epolead GT301, Epolead GT302, Epolead GT401, Epolead GT403, EHPE-3150 and EHPEL 3150CE (produced by Daicel Chemical Industries, Ltd.); and UVR-6105, UVR-6110, UVR-6128, UVR-6100, UVR-6216 and UVR-6000 (produced by Union Carbide Corp.).

The aliphatic epoxide is preferably di or polyglycidyl ether of aliphatic polyhydric alcohol or an alkylene oxide adduct thereof; and typical examples thereof include diglycidyl ether of alkylene glycol such as ethylene glycol diglycidyl ether, propylene glycol diglycidyl ether, 1,6-hexane diol diglycidyl ether or the like; polyglycidyl ether of polyhydric alcohol such as di- or triglycidyl ether of glycerin or an alkylene oxide adduct thereof and diglycidyl ether of polyalkylene glycol such as diglycidyl ether of polyethylene glycol or an alkylene oxide adduct thereof, diglycidyl ether of polypropylene glycol or an alkylene oxide adduct thereof or the like, and so forth. Herein, as the alkylene oxide, ethylene oxide, propylene oxide or the like can be cited.

Further, in addition to these compounds, usable are monoglycidyl ether of higher aliphatic alcohol, monoglycidyl ether of phenol or cresol, and so forth. Of these epoxides, aromatic epoxide and alicyclic epoxide are preferable in consideration of rapid curability, and the alicyclic epoxide is specifically preferable.

[Oxetane Compound]

An oxetane compound is a compound having at least one oxetane (trimethylene oxide) ring in the molecule. Specifically, preferably usable examples thereof include 3-ethyl-3-hydroxymethyloxetane (OXT101, produced by Toagosei Co., Ltd.), 1,4-bis[(3-ethyl-3-oxetanyl)methoxymethyl]benzene (OXT121, produced by Toagosei Co. Ltd.), 3-ethyl-3-(phenoxymethy)oxetane (OXT211, produced by Toagosei Co. Ltd.), di(1-ethyl-3-oxetanyl)methyl ether (OXT221, produced by Toagosei Co. Ltd.), 3-ethyl-3-(2-ethylhexyloxymethyl)oxetane (OXT212, produced by Toagosei Co. Ltd.), di(1-methyl-3-oxetanyl)methyl ether, and so forth. Specifically preferable are 3-ethyl-3-hydroxymethloxetane, 3-ethyl-3-(phenoxymethyl)oxetane, and di(1-ethyl-3-oxetanyl)methyl ether. These can be used singly or in combination with at least 2 kinds thereof.

(Vinyl Ether Compound)

The vinyl ether compound means an organic compound having a vinyl ether group, and is a compound preferably having a molecular weight of 100-2000. Excellent wear resistance and appropriate density of a polymerization group appear in the above-described molecular weight range, and flexible images can be formed at high speed via an ink-jet technique, since a polymerization group and another polymerization group are separated at a sufficient distance. Specifically, the following compounds are suitably usable.

(Monovalent Monovinyl Ether)

Butyl vinyl ether, hexyl vinyl ether, ethylhexyl vinyl ether, phenyl vinyl ether, benzyl vinyl ether, ethylethoxy vinyl ether, acetylethoxyethoxy vinyl ether, cyclohexyl vinyl ether, and adamantyl vinyl ether (Divalent Vinyl Ether)

Ethylene glycol divinyl ether, diethylene glycol divinyl ether, triethylene glycol divinyl ether, propylene glycol divinyl ether, dipropylene glycol vinyl ether, butylene divinyl ether, dibutylene glycol divinyl ether, neopentyl glycol divinyl ether, cyclohexane diol divinyl ether, cyclohexane dimethanol divinyl ether, norbornyl dimethanol divinyl ether, isovinyl divinyl ether, divinyl resorcin, and divinyl hydroquinone (Trivalent Vinyl Ether)

Glycerin trivinyl ether, glycerin ethylene oxide adduct trivinyl ether (the number of moles added by ethylene oxide is 6), trimethylol propane trivinyl ether, and trivinyl ether ethylene oxide adduct trivinyl ether (the number of moles added by ethylene oxide is 3)

(Tetravinyl Ether)

Pentaerythritol trivinyl ether, and Pentaerythritol ethylene oxide adduct trivinyl ether (the number of moles added by ethylene oxide is 9)

(Hexavalent Vinyl Ether)

Ditrimethylol propane hexavinyl ether, and ditrimethylol propane ethylene oxide adduct hexavinyl ether (the number of moles added by ethylene oxide is 6)

Of the above-described vinyl ethers, specifically preferable is vinyl ether having at least divalence. When using vinyl ether having at least divalence, polymerization reaction with acid is accelerated, whereby actinic energy radiation curable sensitivity becomes high, and this is preferable.

Since a vinyl ether monomer exhibits considerably low viscosity, viscosity can be adjusted via addition of a vinyl ether oligomer. Specifically, provided are those commercially available as the product name called VECTOMER (a divinyl ether resin, produced by Allied Signal) such as VECTOMER 2010, VECTOMER 2020, VECTOMER 4010 and VECTOMER 4020; equivalent products available from other manufacturers; and a mixture thereof A mixture of at least one vinyl ether resin and/or at least one epoxy resin (arbitrary ratio) is also usable. A polyhydroxy functional material {for example, one described in the specification of U.S. Pat. No. 5,856,373 (Kaisaki et al.)} can be also used in combination with an epoxy and/or vinyl ether functional material.

(Photo-Polymerization Initiator)

The polymerization initiator of the present invention is one capable of staring polymerization of a polymerizable compound via exposure to actinic energy radiation, and radical polymerization initiators, photo-acid generators and so forth are usable.

Examples of the radical polymerization initiators include those described below.

Examples thereof include triazine derivatives described in Japanese Patent Examined Publication No. 59-1281, Japanese Patent Examined Publication No. 61-9621 and Japanese Patent O.P.I. Publication No. 60-60104; organic peroxides described in Japanese Patent O.P.I. Publication No. 59-1504 and Japanese Patent O.P.I. Publication No. 61-243807; diazonium compounds described in Japanese Patent Examined Publication No. 43-23684, Japanese Patent Examined Publication No. 44-6413, Japanese Patent Examined Publication No. 44-6413, and 47-1604, and U.S. Pat. No. 3,567,453; organic azide compounds described in U.S. Pat. Nos. 2,848, 328, 2,852,379and U.S. Pat. No. 2,940,853; ortho-quinonediazides described in Japanese Patent Examined Publication No. 36-22062, Japanese Patent Examined Publication No. 37-13109, Japanese Patent Examined Publication No. 38-18015 and Japanese Patent Examined Publication No. 45-9610; various kinds of onium compounds described in Japanese Patent Examined Publication No. 55-39162, Japanese Patent O.P.I. Publication No. 59-14023 and "Macromolecules," Vol. 10, page 1307 (1977); azo compounds described in Japanese Patent O.P.I. Publication No. 59-142205; metal allene complexes described in Japanese Patent O.P.I. Publication No. 1-54440, European Patent No. 109,851, European Patent No. 126,712 and "J. Imag. Sci.," Vol. 30, page 174 (1986); (oxo)sulfonium organic boron complexes described in Japanese Patent No. 4-56831 and Japanese Patent No. 4-89535; titanocenes described in Japanese Patent O.P.I. Publication No. 61-151197; transition metal complexes each containing a transition metal such as ruthenium described in "Coordination Chemistry Review," Vol. 84, pages 85-277 (1988) and Japanese Patent O.P.I. Publication No. 2-182701; 2,4,5-triarylimidazole dimers and carbon tetrabromide described in Japanese Patent O.P.I. Publication No. 3-209477; organic halogen compounds described in Japanese Patent O.P.I. Publication No. 59-107344, and so forth.

Any of these photo-polymerization initiators preferably has a content of 0.01-10% by weight, based on 100% by weight of a polymerizable compound.

Examples of photo-acid generators include aryl sulfonium salt derivatives (Silacure UVI-6990and Silacure UVI-6974, produced by Union Carbide Corp.; Adekaoptomer SP-150, Adekaoptomer SP-152, Adekaoptomer SP-170, and Adekaoptomer SP-172, produced by ADEKA Corporation; CPI-100, CPI-110P, and CPI-110A produced by San Apro Ltd.; TS-91 produced by Sanwa Chemical Co., Ltd.; and Esacure 1187, Esacure 1188 produced by Lamberti Co.); allyl iodonium salt derivatives (RP-2074produced by Rodia Co., Irgacure 250 and so forth, produced by BASF Japan Ltd.); Arene-ion complex derivatives (Irgacure 250 and so forth, produced by BASF Japan Ltd.); diazonium salt derivatives; triazine-based initiators; and in addition, acid generators such as halides and so forth.

Each of these acid generators has a ratio of 0.2-10 parts by weight to 100 parts by weight of a polymerizable compound, and preferably a ratio of 0.5-5 parts by weight to 100 parts by weight of the polymerizable compound.

These initiators can be used singly, and in combination with at least two kinds thereof.

Examples of sensitizers for initiators when a sulfonium salt is used as an initiator include anthracene and anthracene derivatives (for example, Adekaoptomer SP-100, diethoxyanthracene, dibutoxyanthracene and so forth, produced by ADEKA Corporation). When an iodonium salt is used as an initiator, thioxanthones and so forth are usable. These sensitizers can be used singly, or in combinations with at least two kinds thereof The sensitizer preferably has an addition amount ratio of 0.2-5 parts by weight, and more preferably has an addition amount ratio of 0.5-4 parts by weight, based on 100 parts by weight of a polymerizable compound.

(Gelling Agent)

A gelling agent of the present invention is a compound capable of reversibly gelling ink-jet ink.

The compound capable of reversibly gelling ink-jet ink (hereinafter, referred to also as an ink composition will be described.

"Gel" state of the present invention has a structure in which solute having lost independent mobility is collected via interaction of a lamella structure, a covalent-bonded or hydrogen-bonded polymeric mesh, polymeric mesh formed by physical coagulation, or a structure in which particles are coagulated, and is referred to as a state of solidification or semi-solidification via rapid increase of viscosity or large increase of elasticity.

The gel state formed from a compound capable of reversibly gelling an ink composition relating to the present invention is called thermally reversible gel {(often called sol) becomes a solution exhibiting fluidity via heating}That is, the ink composition to be used in the present invention undergoes thermally reversible transition between a gel state and a liquid state, and this cycle to form gel can be repeated several times.

Specific examples of compounds each capable of reversibly gelling an ink composition to be preferably used in the present invention include fatty acid inulin such as stearoyl inulin or the like; fatty acid dextrin such as dextrin palmitate, dextrin myristate or the like (available from Chiba Flour Milling Co., Ltd. as Rheopearl series); behenic acid eicosane diacid glyceryl (available from The Nisshin Oillio Group Ltd. as Momucoat series); and behenic acid eicosane diacid polyglyceryl (available from The Nisshin Oillio Group Ltd. as Momucoat series).

Further, examples thereof include low-molecular oil-gelling agents disclosed in Japanese Patent O.P.I. Publication No. 2005-126507, Japanese Patent O.P.I. Publication No. 2005-25582 and Japanese Patent O.P.I. Publication No. 2010-111790; amide compounds such as N-lauroyl-L-gultamic acid dibutyl amide and N-2 etylhexanoyl-L-gultamic acid dibutyl amide (available from Ajinomoto Fine-Techno Co., Ltd.); dibenzylidene sorbitol such as 1, 3:2, 4-bis-o-benzylidene-D-glucitol (GEL ALL, available from New Japan Chemical Co., Ltd.), or the like; petroleum system waxes such as paraffin wax, microcrystalline wax, petrolatum and so forth; plant system waxes such as candelilla wax, carnauba wax, rice wax, Japan wax, jojoba oil, jojoba solid wax, jojoba ester and so forth; animal system waxes such as bees wax, lanolin, spermaceri and so forth; mineral system waxes such as montan wax, a hydrogenated wax and so forth; cured caster oil or a cured caster oil derivative; denatured waxes such as a montan wax derivative, a paraffin wax derivative, a microcrystalline wax derivative, a polyethylene wax derivative and so forth; higher fatty acids such as a behenic acid, an arachidic acid, a stearic acid, a palmitic acid, a myristic acid, a lauric acid, an oleic acid, an erucic acid and so forth; higher alcohols such as behenyl alcohol and so forth; hydroxylstearic acids such as a 12-hydroxystearic acid and so forth; a 12-hydroxystearic acid derivative; fatty acid amides such as lauric acid amide, stearic acid amide, behenic acid amide, oleic acid amide, erucic acid amide, ricinoleic acid amide, 12-hydroxystearic acid amide and so forth (NIKKA AMIDE Series produced by Nippon Kasei Chemical Co., Ltd., TOWAX Series produced by ITO OIL Chemicals Co., Ltd., and FAT-TYAMID Series produced by Kao Corporation, for example); N-substituted fatty acid amides such as N-stearyl stearic acid amide, N-oleyl palmitic acid anide and so forth; special fatty acid amides such as N,N'-ethylene bis stearyl amide, N,N'-ethylene bis 12-hydroxystearyl amide, N,N'-xylene bis stearyl amide and so forth; higher amines such as dodecyl amine, tetradecyl amine, octadecyl amine and so forth; fatty acid ester compounds such as a stearylstearic acid, an oleylpalmitic acid, glycerin fatty acid ester, sorbitan fatty acid ester, propylene glycol fatty acid ester, ethylene glycol fatty acid ester, polyoxy ethylene fatty acid ester and so forth (EMALLEX Series produced by NIHON EMULSION Co., Ltd., RIKEMAL Series produced by RIKEN VITAMINE Co., Ltd., and POEM Series produced by RIKEN VITAMINE Co., Ltd., for example); sucrose fatty acid esters such as a sucrose stearic acid, a sucrose palmitic acid and so forth (RYOTO Sugar Ester Series produced by Mitsubishi Chemical Corporation, for example); synthetic waxes such as polyethylene wax, α-olefin maleic anhydride copolymer wax and so forth; polymerization wax (UNILIN Series produced by Baker-Petrolite Corporation); a dimer acid and dimer diol (produced by CRODA International Plc); the following compounds represented by OG-1, OG-2, OG-3, OG-4, OG-5, OG-6, OG-7, OG-8, OG-9, 0G-10, 0G-11, OG-12, OG-13, OG-14 and OG-15, respectively; and so forth. Further, the above-described gelling agents may be used singly, or in combination with at least two kinds thereof.

Of these, preferably used are fatty acid esters such as stearyl stearate, behenyl behenate, ethylene glycol distearate, triethylene glycol distearate, monoglyceride stearate, diglyceride stearate, pentaerythritol distearate, pentaerythritol tetrastearate, sorbitan monostearate, sorbitan distearate and so forth, and ketone waxes such as STEARONE, LAURONE and so forth, each having a melting point of 40-100° C.

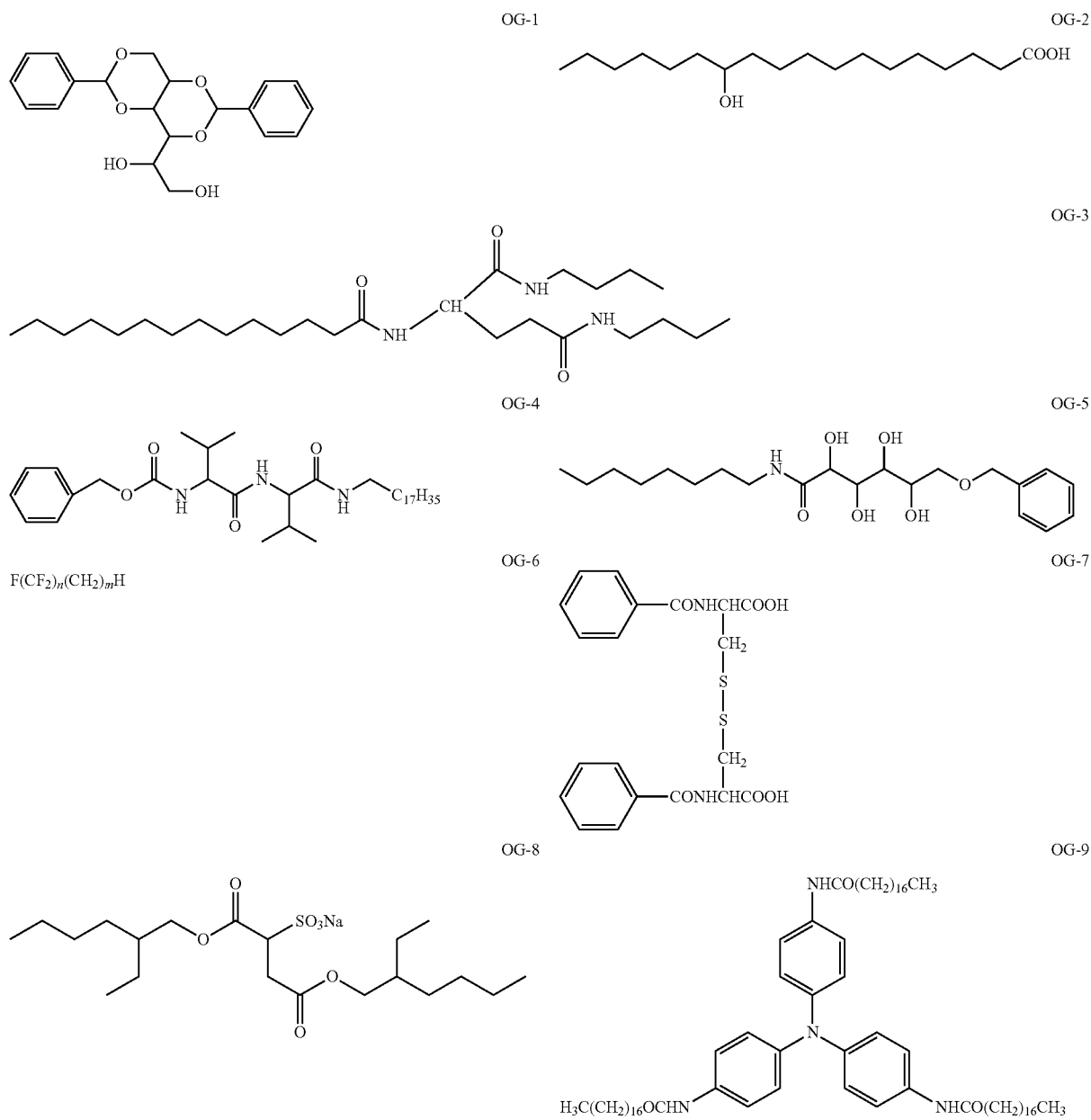

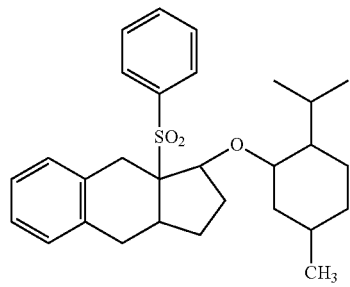

OG-10

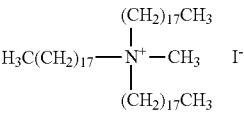

OG-11

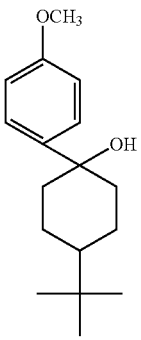

OG-12

OG-13

OG-14

OG-15

Ink-jet ink of the present invention contains a gelling agent as described above, and a phase transition occurs preferably at 25° C. or more. The phase transition generated at 25° C. or more means that the ink-jet ink has a phase transition point at a temperature of 25° C. or more, and temperature at the phase transition point is referred to as a value measured via the following differential scanning thermal analysis.

Differential Scanning Thermal Analysis (DSC):

Temperature is varied under nitrogen atmosphere at 10° C./min in the process of 20° C.→100° C.→20° C. in this order, employing DSC 220C/SSC5200 station manufactured by SEICO Electronics Industrial Co., Ltd., and temperature exhibiting an exothermic peak in the temperature-falling process of 100° C.→20° C. is designated as a phase transition temperature.

Further, the phase transition temperature is preferably 40-100° C., and more preferably 45-80° C. in view of prevention of dot union and prevention of polymerization caused by heat.

In the present invention, preferable is a compound as a gelling agent in which gelation is produced at 40-100° C., that is, a phase transition is generated.

In order to make temperature at the phase transition point of ink-jet ink of the present invention to be as described above, 3.0-20% by weight of a gelling agent are preferably contained with respect to ink-jet ink.

The ink-jet ink of the present invention is in the form of gel or in the form of a solid at 25° C., and viscosity at a shear rate of 1000/sec at 25° C. thereof is preferably 60-200 mPa sec.

Viscosity described herein is referred to as a value obtained by measuring viscosity at a shear rate of 1000/sec at an ink temperature of 25° C., employing a rheometer MCR 300 manufactured by PaarPhysica.

"Being in the form of gel" means a state where deformation is generated by stress, but fluidity largely drops.

Ink-jet ink of the present invention may contain a basic compound in order to improve ejection stability.

As basic compounds, commonly known various compounds are usable, but typical examples thereof include basic alkali metal compounds, basic alkali earth metal compounds, and basic organic compounds such as amine and so forth.

Examples of basic alkali metal compounds include alkali metal hydroxides such as lithium hydroxide, sodium hydroxide, potassium hydroxide and so forth; alkali metal carbonates such as lithium carbonate, sodium carbonate, potassium carbonate and so forth; and alkali metal alcoholates such as sodium methoxide, sodium ethoxide, potassium methoxide, potassium ethoxide and so forth.

Similarly, examples of basic alkaline earth metal compounds include alkaline earth metal hydroxides such as magnesium hydroxide, calcium hydroxide and so forth; alkali metal carbonates such as magnesium carbonate, calcium carbonate and so forth; and alkali metal alcoholates such as magnesium methoxide and so forth.

As basic organic compounds, listed are amines and nitrogen-containing heterocyclic compounds such as quinoline, quinolizine and so forth, but of these, amines are preferable from the viewpoint of compatibility with a photo-polymerizable monomer, and examples thereof include octyl amine, naphthyl amine, xylene diamine, dibenzyl amine, diphenyl amine, dibutyl amine, trioctyl amine, tetramethyl ethylene diamine, tetramethyl-1,6-hexamethylene diamine, hexamethylene tetramine, 2-(methylamino)ethanol, triethanol amine and so forth.

The concentration of the basic compound is 10-50,000 ppm by weight, and preferably 100-5000 ppm by weight, based on the total weight of the photo-polymerizable monomer. In addition, the basic compound may be used singly, or in combinations with at least two kinds thereof.

The ink-jet ink preferably contains commonly known various dyes and/or pigments, and more preferably contains a pigment.

Pigments preferably usable in the present invention are listed below.

C. I. Pigment Yellow 1, C. I. Pigment Yellow 2, C. I. Pigment Yellow 3, C. I. Pigment Yellow 12, C. I. Pigment Yellow 13, C. I. Pigment Yellow 14, C. I. Pigment Yellow 16, C. I. Pigment Yellow 17, C. I. Pigment Yellow 73, C. I. Pigment Yellow 74, C. I. Pigment Yellow 75, C. I. Pigment Yellow 81, C. I. Pigment Yellow 83, C. I. Pigment Yellow 87, C. I. Pigment Yellow 93, C. I. Pigment Yellow 95, C. I. Pigment Yellow 97, C. I. Pigment Yellow 98, C. I. Pigment Yellow 109, C. I. Pigment Yellow 114, C. I. Pigment Yellow 120, C. I. Pigment Yellow 128, C. I. Pigment Yellow 129, C. I. Pigment Yellow 138, C. I. Pigment Yellow 150, C. I. Pigment Yellow 151, C. I. Pigment Yellow 154, C. I. Pigment Yellow 155, C. I. Pigment Yellow 180, C. I. Pigment Yellow 185 and C. I. Pigment Yellow 213

C. I. Pigment Red 5, C. I. Pigment Red 7, C. I. Pigment Red 12, C. I. Pigment Red 22, C. I. Pigment Red 38, C. I. Pigment Red 48:1, C. I. Pigment Red 48:2, C. I. Pigment Red 48:4, C. I. Pigment Red 49:1, C. I. Pigment Red 53:1, C. I. Pigment Red 57:1, C. I. Pigment Red 63:1, C. I. Pigment Red 101, C. I. Pigment Red 112, C. I. Pigment Red 122, C. I. Pigment Red 123, C. I. Pigment Red 144, C. I. Pigment Red 146, C. I. Pigment Red 168, C. I. Pigment Red 184, C. I. Pigment Red 185 and C. I. Pigment Red 202

C. I. Pigment Violet 19, and C. I. Pigment Violet 23

C. I. Pigment Blue 1, C. I. Pigment Blue 2, C. I. Pigment Blue 3, C. I. Pigment Blue 15 : 1, C. I. Pigment Blue 15:2, C. I. Pigment Blue 15:3, C. I. Pigment Blue 15:4, C. I. Pigment Blue 18, C. I. Pigment Blue 22, C. I. Pigment Blue 27, C. I. Pigment Blue 29 and C. I. Pigment Blue 60

C. I. Pigment Green 7 and C. I. Pigment Green 36

C. I. Pigment White 6, C. I. Pigment White 18 and C. I. Pigment White 21

C. I. Pigment Black 7

A ball mill, a sand mill, an attritor, a roll mill, an agitator, a Henschel mixer, a colloidal mixer, an ultrasonic homogenizer, a pearl mill, a wet jet mill, a paint shaker are usable in order to disperse the above-described pigment. Further, when dispersing a pigment, a dispersant can be added therein. As a dispersant, a polymer dispersant is preferably used, and as the polymer dispersant, SOLSPERSE Series produced by Avecia Corp. and PB Series produced by Ajinomoto Fine-Techno Co., Inc. are listed.

Further, a synergist as a dispersion aid is usable, depending on various kinds of pigment. These dispersants and dispersion aids are preferably added in an amount of 1-50 parts by weight, with respect to 100 parts by weight of pigment. A dispersion medium is used with a solvent or a polymerizable compound, but in the case of actinic energy radiation curable ink used in the present invention, non-solvent is preferable, since reaction•curing is conducted immediately after ink deposition. When a solvent remains in a cured image, there appears problems such as deterioration of solvent resistance and VOC of a residual solvent. Therefore, it is preferable to select not solvent but polymerizable compounds as the dispersion medium, and more preferable to select a monomer having the lowest viscosity among them, in view of dispersing suitability.

As to dispersion of a pigment, selection of pigments, dispersants, selection of dispersion media, dispersion conditions and filtration conditions are suitably set so as to make pigment particles to have a mean particle diameter of 0.08-0.2 µm, and to make the pigment particles to have a maximum particle diameter of 0.3-10 µm and preferably 0.3-3 µm. Clogging of a head nozzle is suppressed via control of this particle diameter, whereby ink-storage stability, ink transparency and curing sensitivity can be maintained.

As to ink-jet ink of the present invention, the colorant preferably has a concentration of from 1-10% by weight, based on the total weight of the ink-jet ink.

Various additives such as a surfactant, a lubricant, a filler, a corrosion control agent, an antifoam agent, a thickener, a gelling agent, and polymers each can be contained in ink of the present invention, if desired. Further, a small amount of a solvent such as an ester based solvent, an ether based solvent, an ether ester based solvent, a ketone based solvent, an aromatic hydrocarbon solvent, a nitrogen-containing organic solvent or the like can be also added therein, if desired.

The ink-jet ink of the present invention is prepared by sufficiently dispersing a pigment together with a polymerizable compound, a photo-polymerization initiator and a gelling agent in addition to a pigment dispersant employing a conventional dispersing machine such as a sand mill or the like. A condensed liquid having high concentration of the pigment has been prepared in advance, and it is preferably diluted with a polymerizable compound.

It is possible to conduct sufficient dispersion also in the case of dispersion with a conventional dispersing machine. For this reason, the ink component is not difficult to be altered during dispersion, and ink exhibiting excellent stability can be prepared because of neither excessive dispersion energy to be applied thereto, nor a great deal of dispersion time to be required. The prepared ink is preferably filtrated employing a filter having an opening diameter of 3 µm or less, and preferably having an opening diameter of 1 µm or less.

As to dispersion of the pigment, a pigment, a dispersant, selection of a dispersing medium, a dispersion condition and a filtration condition are to be designed so as to make the average particle diameter to be 0.08-0.5 µm; preferably to be 0.3-3 µm; and to be 0.3-10 µm as the maximum particle diameter. Head nozzle clogging is inhibited via control of this particle diameter, and ink storage stability, ink transparency and curing sensitivity can be maintained.

A pigment or an oil-soluble dye preferably has an addition amount of 0.1-20% by weight, and more preferably has an addition amount of 0.4-10% by weight. In the case of 0.1% by weight or more, excellent image quality can be obtained, and in the case of 20% by weight or less, suitable ink viscosity during ink-ejection can be obtained. Further, at least two kinds of colorants are appropriately mixed, and are usable for color-adjustment and so forth.

(Recording Medium)

Examples of recording media used in the present invention include a resin such as polyester, polyvinyl chloride, polyethylene, polyurethane, polypropylene, an acrylic resin, polycarbonate, polystyrene, an acrylonitrile-butadiene-styrene copolymer, polyethylene terephthalate, polybutadiene terephthalate or the like; a film made of the foregoing resin; a substrate on which the resin is provided; metal; glass; and printing paper.

Printing paper is classified into coated paper and non-coated paper. Examples of coated paper include art paper having a one surface coating amount of approximately 20 g per/$m^2$, coated paper having a one surface coating amount of approximately 10 g per/$m^2$, light weight coated paper having a one surface coating amount of approximately 5 g per/$m^2$, ultra-light weight coated paper, matte-finished coated paper, dull-finished dull-coated paper, newsprint paper and so forth.

Examples of non-coated paper include printing paper A made from 100% chemical pulp, printing paper B made from at least 70% chemical pulp, printing paper C made from 40-70% chemical pulp, printing paper D made from less than 40% chemical pulp, gravure paper containing mechanical pulp which has been subjected to a calender treatment, and so forth. Further, more detail is provided in "Saishin Kamikako Binran (Handbook of Recent Paper Treatments)", edited by Kako Binran Henshuiinkai, published by Tech. Times, "Insatsu Kogaku Binran (Printing Engineering Handbook)", edited by Nihon Insatsu Gakkai (The Japanese Society of Printing Science and Technology), and so forth.

So-called plain paper is also usable. The plain paper employs 80-200 μm thick non-coated paper which belongs to non-coated paper, special printing paper or a part of information paper.

Examples of plain paper include high quality printing paper, medium quality printing paper, and low quality printing paper, thin printing paper, ultra-light weight coated printing paper, special printing paper such as high quality colored paper or the like, form paper, PPC paper, and others such as information paper and so forth. Specifically, available are the following paper and various modified paper and processed paper employing these, but the present invention is not limited thereto.

Specific examples of recording media are those described below.

Examples thereof include high-quality paper or colored high-quality paper, recycled paper, copy paper•color, OCR paper, no carbon paper•color, synthetic paper such as YUPO 60 micron, YUPO 80 micron, YUPO 110 micron, YUPO COAT 70 micron, YUPO COAT 90 micron or the like, and others such as one-side art paper 68 kg, coat paper 90 kg, foam matte paper 70 kg, foam matte paper 90 kg, foam matte paper 110 kg, foam PET 38 micron, and MITSUORIKUN (available from Kobayashi Create Co,. Ltd.); OK high-quality paper, NEW OK high-quality paper, SUNFLOWER, PHENIX, OK ROYAL WHITE, export high-quality paper (NPP, NCP, NWP and ROYAL WHITE), OK book paper, OK cream book paper, cream high-quality paper, OK map paper, OK ISHIKARI, KYUREI, OK FORM, OKH, NIP-N (available from Shin Oji Paper Co,. Ltd.); KINOU, TOUKOU, export high-quality paper, special high quality paper, book paper, book paper L, light cream book paper, elementary school science textbook paper, continuous slip paper, high quality NIP paper, GINKAN, KINYOU, KINYOU (W), BRIDGE, CAPITAL, GINKAN book, HARP, HARP CREAM, SK COLOR, securities paper, OPERA CREAM, OPERA, KYP chart, SYLVIA HN, EXCELLENT FORM, and NPI FORM DX (available from Nippon Paper Group, Inc.); PEARL, KINBISHI, light cream high-quality paper, special book paper, super book paper, book paper, DIA FORM, and INK-JET FORM (available from Mitsubishi Paper Mills, Inc.); KINMARI V, KINMARI SW, HAKUZOU, high-grade publishing paper, CREAM KINMARI, CREAM HAKUZOU, securities voucher paper, book paper, map paper, copy paper, and HNFC (available from Hokuetsu Paper Co., Ltd.); SIORAI, telephone directory cover sheets, book paper, CREAM SHIORAI, CREAM SHIORAI moderately rough, CREAM SHIORAI largely rough, and DSK (available from Daishowaseishi Co., Ltd.); SENDAI MP high-quality paper, NISHIKIE, RAICHOU high-quality, hanging paper, base paper for colored paper, dictionary paper, CREAM book paper, and continuous slip paper (available from Chuetsu Pulp & Paper Co., Ltd.); OP KINZAKURA (Chuetsu), KINSA, reference book paper, exchange certificate paper (white), form printing paper, KRF, WHITE FORM, COLOR FORM, (K) NIP, and FINE PPC (available from Kishu Paper Co., Ltd.); TAIOU, GRIGHT FORM, CANTO, CANTO WHITE, DANTE, CM paper, DANTE COMIC, HEINE, paperback paper HEINE S, NEW AD paper, UTRILLO Plus 9 EXCEL, HEINE EXCEL, EXCEL SUPER C, EXCEL SUPER D, AD EXCEL, EXCEL SUPER E, NEW GRIGHT FORM, and NEW BRIGHT NIP (available from Daio Paper Corp.); NICHIRIN, GACHIRIN, UNREI, GINGA, SHIRAKUMO, WEISS, GACHIRIN ACE, SHIRAKUMO ACE, and UNSHIN ACE (available from Nihonshigyo Co., Ltd.); TAIOU, BRIGHT FORM, BRIGHT NIP (available from Nagoya Pulp Co., Ltd.); NICHIRIN, GACHIRIN, UNREI, GINGA, SHIRAKUMO, WEISS, GACHIRIN ACE, SHIRAKUMO ACE, and UNSHIN ACE (available from Nihinshigyou Co., Ltd.); TAIOU, BRIGHT FORM, and BRIGHT NIP (available from Nagoya Pulp Co., Ltd.); BOTAN A, KINBATO, special BOTAN, SHIROBOTAN A, SHIROBOTAN C, GINBATO, SUPER SHIROBOTAN A, LIGHT CREAM SHIROBOTAN, SUPER medium-quality paper, AOBATO, AKABATO, KINBATO M SNOWVISION, SNOWVISION, KINBATO SNOWVISION, SHIROHATO M, SUPER DX, HAMANASU O, AKABATO M, and HK super printing paper (Honshuseishi Co., Ltd.); STARLINDEN (A•AW), STARELM, STARMAPLE, STARLAUREL, STARPOPULAR, MOP, STARCHERRY CHERRY I SUPER, CHERRY II SUPER, STARCHERRY III, STARCHERRY IV, CHERRY III SUPER, and CHERRY N SUPER (available from Marusumi Paper Co., Ltd.); TRP (available from Tokai Pulp & Paper Co., Ltd.); and so forth.

(Ink-Jet Recording Head)

In the ejection step, liquid droplets of actinic energy radiation curable type ink-jet ink according to the present invention is injected from an ink-jet recording head to supply onto a recording medium, and to form images.

Any of an on-demand system and a continuous system is allowed to be used for an ink-jet recording head of the present invention.

Further, specific examples of ejection systems include an electrical-mechanical conversion system (for example, a single cavity type, a double cavity type, a vendor type, a piston type, a share mode type, a shared wall type or the like); an electrical-thermal conversion system (for example, a thermal ink-jet type, a bubble jet type (registered trademark) or the like); an electrostatic suction type (for example, an electric field control type, a slit jet type or the like); a discharge type (for example, a spark jet type or the like), and so forth.
[Line Head Type Ink-Jet Recording Head]

Further, any type of ink-jet recording heads such as a line head type ink-jet recording head and a serial type ink-jet recording head is also usable.

It is preferable as the ink-ejecting condition in view of ejection stability that an ink-jet recording head and ink are heated to a temperature of 35-130° C. to eject the ink.

Since the ink of the present invention has a considerably large viscosity fluctuation band produced by temperature variation, and the viscosity fluctuation largely influences liquid droplet size and liquid droplet ejection speed, it is preferable to maintain the temperature in the predetermined range while increasing ink temperature, and to conduct ejection thereof in that state.

This predetermined temperature range is preferably preset temperature ±5° C., more preferably preset temperature ±2° C., and still more preferably preset temperature ±1° C.

In order to form high quality images, the liquid droplet amount ejected from each of ink-jet recording head nozzles is preferably 1-15 pl.
[Actinic Energy Radiation Exposure Step]

In the actinic energy exposure step, ink-jet ejected onto a recording medium is exposed to actinic energy radiation to form images.

Examples of the actinic energy radiation include UV radiation, visible light, alpha-ray, beta-ray, gamma-ray, X-ray and so forth.

Usable examples of light sources in the case of application of UV radiation include a low-pressure, moderate-pressure or high-pressure mercury lamp having an operation pressure of several 100Pa to 1 MPa, a metal halide lamp, and those commonly known such as a Xenon lamp having an emission wavelength in the UV range, a cold-cathode tube, a hot-cathode tube and an LED
(Energy radiation exposure condition after depositing ink)

In the actinic energy radiation exposure step, ink is deposited onto a recording medium, and subsequently, the ink is exposed to actinic rays preferably for 0.001-1.0 sec after the ink is exposed to electromagnetic waves in the after-mentioned step (A), and more preferably for 0.001-0.5 sec after the ink is exposed to electromagnetic waves in the after-mentioned step (A). In order to form high quality images, the earliest possible timing is preferable for exposure timing.
(Actinic Energy Radiation Exposure Method)

The following method is usable as an actinic energy radiation exposure method. For example, there is a method disclosed in Japanese Patent O.P.I. Publication No. 60-132767. This is a method in which a light source is provided on the both sides of a head unit to scan the head and the light source with a shuttle system. Ink is deposited, and subsequently, exposure is to be conducted after spending the predetermined time.

Further, there is a method in which curing is completed by a separately installed light source unaccompanied with driving. In U.S. Pat. No. 6,145,979, disclosed are a method in which optical fibers are utilized, and another method in which a mirror surface provided on the side of the head unit is applied to a collimated light source to expose a recording section to UV radiation, as exposure methods. Any of these methods is usable in the present invention.
(Step (A))

In step (A), before conducting the above-described actinic energy radiation exposure step, a recording medium is exposed to electromagnetic waves having a longer wavelength than a wavelength of an absorption wavelength of a photo-polymerization initiator contained in the actinic energy radiation curable type ink-jet ink from a side of a surface on which the image is formed.

The electromagnetic waves having a longer wavelength than a wavelength of an absorption wavelength of a photo-polymerization initiator mean electromagnetic waves having a longer wavelength than a wavelength exhibiting absorption maximum of the photo-polymerization initiator, and examples of the electromagnetic waves include visible light, infrared rays and microwaves.

What a recording medium is exposed to electromagnetic waves means that ink and the recording medium are exposed to the above-described electromagnetic waves without bringing a generation source into direct contact with ink-jet ink.

The reason why prints having images exhibiting excellent image wear resistance, gloss evenness and image density evenness are obtained by conducting step (A) in the present invention is presumably given as described below.

That is, at the stage where ink liquid droplets are deposited on a recording medium formed of plain paper or the like, solidification of the ink liquid droplets is completed in an extremely short period of time by using a gelling agent for ink-jet ink, whereby diffusion of the ink liquid droplet component and generation of print-through resistance in cases where plain paper is used can be effectively avoided.

However, since the resulting image layer exhibits insufficient strength in the case of only phase transition (sol→gel) caused by a gelling agent, images each exhibiting improved printing durability can be obtained by exposing a polymerizable compound contained in ink at the same time to UV radiation for curing.

However, difference of elevation between a printing portion and a non-printing portion, caused by elevation of deposited dots from a recording medium becomes large, since ink droplets are rapidly solidified after depositing them.

For this reason, difference in gloss between the printing portion and the non-printing portion has become highly visible, and it was found out via studies done by the inventors that liquid migration with respect to deposited dots was generated.

In relation to this, when a printing image portion is exposed to electromagnetic waves having a longer wavelength than an absorption wavelength of an initiator contained in ink-jet ink before printing and conducting actinic energy radiation exposure, reversible sol-gel transition reaction of a gelling agent is produced again without making a polymerizable compound contained in deposited dots to produce photo-polymerizable reaction, and elevation of the dot is suppressed via slight reduction of ink viscosity to form dots, resulting in appearance of flatness-smoothing.

For this reason, gloss unevenness between an image portion and a non-image portion is dissolved. Further, load in the lateral direction with respect to the dot via paratripsis is reduced when the dot height is lowered, whereby wear resistance is improved. On the other hand, it is assumed that ink after deposition thereof is softened via heat in cases where a gelling agent contained in the dot is softened by providing hot-air, for example, but a distribution of liquid inside a dot is lopsided by providing air at the same time, resulting in generation of liquid migration and color bleeding, whereby prints possessing images each exhibiting excellent gloss unevenness and excellent image density evenness are not obtained.

Further, in the present invention, it is assumed that ink supplied onto a recording medium is difficult to be influenced by thickness of the recording medium or the like since the surface of ink is subjected to further heating, and ink is effectively heated, and thereafter, since the heated portion is cooled, flatness-smoothing of the surface becomes high, resulting in improvement of wear resistance and appearance of excellent image printing durability.

In such a viewpoint, as the above-described electromagnetic waves, infrared radiation is preferable, and further, far-infrared radiation is preferably used.

Infrared radiation has a longer wavelength than that of red light, and is designated as overall electromagnetic waves having a shorter wavelength than that of millimeter waves as radio waves. The infrared radiation is energy radiation having a wavelength of roughly 0.7 μm-1 mm, and has power capable of heating a material.

Among these, far-infrared radiation gives kinetic energy to molecules having electrical polarity to activate molecular motion, and the molecular motion is accelerated, resulting in generation of heat via collision with other molecules. In this manner, when energy necessary for softening a gelling agent contained in ink is effectively provided, and height of the resulting dot having been deposited once is lowered, uncomfortable feeling originated from difference in gloss between a printing portion and a non-printing portion can be dissolved.

Further, as energy to be provided, radio waves having a wavelength of 100 μm-1 m, and a frequency of 300 MHz-3 THz are usable in addition to infrared radiation.

In the present invention, step (A) as described above is preferably a heating step as an embodiment.

(Infrared Radiation)

Infrared radiation is classified into near-infrared radiation and far-infrared radiation in terms of wavelength.

The near-infrared radiation is designated as infrared radiation having a wavelength of 0.75-4μm. On the other hand, the far-infrared radiation, which has a longer wavelength than the foregoing wavelength, is designated as infrared radiation having a wavelength of 4-1000 μm.

In addition to conventional infrared lamps, examples of infrared radiation sources include a Xenon flash lamp, a Xenon lamp, a Xenon short-arc lamp, a near-infrared radiation halogen heater, an infrared LED, a near-infrared radiation laser and so forth.

Preferably used are a Xenon flash lamp, a Xenon lamp, a near-infrared radiation halogen heater, an infrared LED, a solid-state laser or a semiconductor laser radiating infrared radiation having a wavelength of 700-1500 nm. Further, other infrared radiation sources may be accessorily used. As far-infrared radiation heaters each used for an infrared radiation drying device, used are those in the form of a panel, a tube or a lamp.

(Microwaves)

Microwaves are designated as electromagnetic waves having a wavelength of 100μm-1 m, and heating becomes possible since charged particles and electric dipoles in a material are rotated or vibrated via influence of oscillating electromagnetic field caused by microwaves.

As a radiation source of microwaves, a commercially available household microwave oven is usable.

In step (A), supplied ink-jet ink on the recording medium is exposed to electromagnetic waves from the (surface) side where the ink-jet ink is present, that is, from the surface side where an image is formed.

Timing of exposure thereof to electromagnetic waves is preferably after conducting an ejection step, and in particular, is preferably right after the ink-jet ink is supplied onto a recording medium.

The duration of exposure thereof to electromagnetic waves is preferably in the range of 0.1-60 sec, and is more preferably in the range of 5-40 sec.

The output power of a radiation source of electromagnetic waves is preferably adjusted so as to maintain temperature of the ink-jet ink in the range of 60-90° C. Temperature of the ink-jet ink can be measured with a non-contact type thermometer.

EXAMPLE

Next, the present invention will be specifically described referring to Examples, but the present invention is not limited thereto.

| <Preparation of ink A (hot-melt ink)> | |
|---|---|
| Colorant: C.I. Pigment Blue 15:3 (a mean particle diameter of 100 nm) | 5 parts by weight |
| Paraffin wax (155, produced by Nippon Seiro Co., Ltd.) | 45 parts by weight |
| Behenic acid (produced by Wako Pure Chemical Industries, Ltd.) | 30 parts by weight |
| Oleic acid amide (fatty acid amide ON, produced by Kao Corporation) | 20 parts by weight |

After each of additives described above was mixed in order, and heated to 150° C. while stirring, the resulting liquid was filtrated with a filter under the heating, and cooled to prepare ink A.

<Preparation of Ink B (Cationic UV Ink with Use of Gelling Agent>

| <Preparation of cyan pigment dispersion 1> | |
|---|---|
| C.I. Pigment Blue 15:3 | 20 parts by weight |
| PB 822 (dispersant, produced by Ajinomoto Fine-Techno Co., Inc.) | 8 parts by weight |
| Oxetane (OXT 221, produced by Toagosei Co., Ltd.) | 72 parts by weight |

After mixing each of the above-described additives, the dispersing condition was appropriately adjusted to conduct dispersing with a commonly known dispersing apparatus in such a way that the average particle diameter of pigment particles fell within the range of 0.2 and 0.3 μm, followed by filtrating with a filter while heating to prepare cyan pigment dispersion 1.

| <Preparation of ink B> | |
|---|---|
| Cyan pigment dispersion 1 | 20 parts by weight |
| Polymerizable compound 1: Alicyclic epoxy compound (CEL 2021P, produced by Daicel Corporation) | 15 parts by weight |
| Polymerizable compound 2: Oxetane (OXT 221, produced by Toagosei Co., Ltd.) | 51.5 parts by weight |
| STEARON (produced by Alfa Aesar) | 10 parts by weight |
| Photo-polymerization initiator 1: Iodonium salt (IBPF, produced by Sanwa Chemical Co., Ltd.) | 2.5 parts by weight |
| Thioxanthone (DETX, produced by Nippon Kayaku Co., Ltd.) | 1.0 part by weight |

After each of substances described above was added in order and mixed, the resulting liquid was filtrated with a filter having an absolute filtration accuracy of 2 μm to prepare ink B.

<Preparation of Ink C (Radical UV Ink with Use of Gelling Agent)>

| <Preparation of cyan pigment dispersion 2> | |
| --- | --- |
| C.I. Pigment Blue 15:3 | 20 parts by weight |
| Polymer dispersant (Solsperse series, produced by Zeneca Limited) | 5 parts by weight |
| Stearyl acrylate | 75 parts by weight |

After mixing each of the above-described additives, the dispersing condition was appropriately adjusted to conduct dispersing with a commonly known dispersing apparatus in such a way that the average particle diameter of pigment particles fell within the range of 0.2 and 0.3 μm, followed by filtrating with a filter while heating to prepare cyan pigment dispersion 2.

| <Preparation of ink C> | |
| --- | --- |
| Cyan pigment dispersion 2 | 20 parts by weight |
| Photo-polymerizable compound 1: Lauryl acrylate (monofunctional) | 10 parts by weight |
| Photo-polymerizable compound 2: Ethylene oxide modified trimethylol propane triacrylate (trifunctional) | 10 parts by weight |
| Photo-polymerizable compound 3: Caprolactam modified dipentaerythritol hexaacrylate (hexafunctional) | 20 parts by weight |
| Photo-polymerizable compound 4: Tetraethylene glycol diacrylate (bifunctional) | 25 parts by weight |
| STEARON (produced by Alfa Aesar) | 10 parts by weight |
| Polymerization initiator 1: Irgacure 184 (produced by BASF Japan Ltd.) | 2.5 parts by weight |
| Polymerization initiator 2: Irgacure 907 (produced by BASF Japan Ltd.) | 2.5 parts by weight |

Each of the above-described additives was added in order, and mixed at 100° C., followed by filtrating with a filter having an absolute filtration accuracy of 2 μm to prepare ink C.

| <Preparation of ink C (Cation, UV ink)> (Preparation of pigment dispersion 3) | |
| --- | --- |
| C.I. Pigment Blue 15:3 | 20 parts by weight |
| PB 822 (produced by Ajinomoto Fine-Techno Co., Inc.) | 8 parts by weight |
| Cyclohexane divinyl ether (CHDVE, produced by Nippon Carbide Industries Co., Inc.) | 72 parts by weight |

Twenty parts by weight of the pigment were added into this after cooling to the room temperature. After the resulting solution together with 200 parts by weight of zirconia beads each having a diameter of 0.5 mm was charged in a glass bottle, followed by conducting a dispersing treatment for 10 hours employing a paint shaker, zirconia beads were removed therefrom to prepare cyan pigment dispersion 3 as a cyan pigment dispersion.

| (Preparation of ink) | |
| --- | --- |
| Pigment dispersion 3 | 20 parts by weight |
| Cyclohexane divinyl ether (CHDVE, produced by Nippon Carbide Industries Co., Inc.) | 43 parts by weight |
| Vinyl ether oligomer (Vectomer 2020, produced by Aldrich) | 20 parts by weight |
| STEARON (produced by Alfa Aesar) | 10 parts by weight |
| TEMPO (2,2,6,6-tetramethyl piperidine 1-oxyl) | 0.03 parts by weight |
| CPI-100P: Propylene carbonate 50% solution of triaryl sulfonium salt (produced by San-Apro Ltd.) | 2 parts by weight |

Each of the above-described additives was added in order, and mixed at 120° C., followed by filtrating with a filter having an absolute filtration accuracy of 2 μm to prepare ink D.

| <Preparation of ink E> | |
| --- | --- |
| Cyan pigment dispersion 2 | 20 parts by weight |
| Photo-polymerizable compound 1: Lauryl acrylate (monofunctional) | 10 parts by weight |
| Photo-polymerizable compound 2: Ethylene oxide modified trimethylol propane triacrylate (trifunctional) | 10 parts by weight |
| Photo-polymerizable compound 3: Caprolactam modified dipentaerythritol hexaacrylate (hexafunctional) | 25 parts by weight |
| Photo-polymerizable compound 4: Tetraethylene glycol diacrylate (bifunctional) | 25 parts by weight |
| STEARON | 3 parts by weight |
| Microcrystalline wax | 2 parts by weight |
| Polymerization initiator 1: Irgacure 184 (produced by BASF Japan Ltd.) | 2.5 parts by weight |
| Polymerization initiator 2: Irgacure 907 (produced by BASF Japan Ltd.) | 2.5 parts by weight |

Each of the above-described additives was added in order, and mixed at 100° C., followed by filtrating with a filter having an absolute filtration accuracy of 2 μm to prepare ink E.

| <Preparation of ink F> | |
| --- | --- |
| Cyan pigment dispersion 2 | 20 parts by weight |
| Photo-polymerizable compound 1: Lauryl acrylate (monofunctional) | 10 parts by weight |
| Photo-polymerizable compound 2: Ethylene oxide modified trimethylol propane triacrylate (trifunctional) | 12 parts by weight |
| Photo-polymerizable compound 3: Caprolactam modified dipentaerythritol hexaacrylate (hexafunctional) | 25 parts by weight |
| Photo-polymerizable compound 4: Tetraethylene glycol diacrylate | 25 parts by weight |
| Behenyl behenate | 3 parts by weight |
| Polymerization initiator 1: Irgacure 184 (produced by BASF Japan Ltd.) | 2.5 parts by weight |
| Polymerization initiator 2: Irgacure 907 (produced by BASF Japan Ltd.) | 2.5 parts by weight |

Each of the above-described additives was added in order, and mixed at 100° C., followed by filtrating with a filter having an absolute filtration accuracy of 2 μm to prepare ink F.

Next, images each were formed on a recording medium with the after-mentioned head and printer, employing each of the resulting ink A, ink B, ink C, ink D, ink E and ink F described above, and processes described in Table 1 were conducted, followed by exposure thereof to UV radiation to subsequently evaluate gloss, liquid migration and wear resistance in accordance with the method described below.

Evaluation criteria and results are shown in Table 1.

TABLE 1

| Print sample No. | Ink | Process | Gloss evenness | Image density evenness | Wear resistance | Remarks |
|---|---|---|---|---|---|---|
| 101 | A | — | D | B | E | Comparative example |
| 102 | B | — | C | B | E | Comparative example |
| 103 | A | Heat-pressure | C | C | C | Comparative example |
| 104 | B | Heat-pressure | D | B | E | Comparative example |
| 105 | B | Hot-air | B | D | C | Comparative example |
| 106 | A | Heater | C | B | D | Comparative example |
| 107 | C | Heater | B | A | C | Present invention |
| 108 | B | Heater | B | A | B | Present invention |
| 109 | A | Far-infrared radiation | C | B | D | Comparative example |
| 110 | C | Far-infrared radiation | A | A | B | Present invention |
| 111 | B | Far-infrared radiation | A | A | C | Present invention |
| 112 | D | Far-infrared radiation | A | A | B | Present invention |
| 113 | C | Microwaves | B | B | B | Present invention |
| 114 | B | Microwaves | B | B | B | Present invention |
| 115 | D | Microwaves | B | B | B | Present invention |
| 116 | E | Far-infrared radiation | A | A | A | Present invention |
| 117 | F | Far-infrared radiation | A | A | A | Present invention |

Each ink having been prepared as described above was provided in a line head system ink-jet recording apparatus equipped with a piezo type head employing art paper sheets (TOKUHISHI ART Double-sided N, produced by Mitsubishi Paper Mills, Ltd.) as a recording medium to print solid monochrome wedge-like images.

In addition, an ink supply system is composed of an ink tank, a supply pipe, a front room ink tank immediately before the head, a piping equipped with a filter, and a recording head, and the region up to the recording head from the front room tank was heat-insulated, and heated to 120° C. The recording head was driven in such a way that multi-size dots each of 4 pl were ejected at a resolution of 1440×1440 dpi to continuously eject it with ink.

After recording media were subjected to the following processes (described in Table 1), respectively, the resulting was exposed to UV radiation at an energy density of 140 W/cm and an illuminance of 20 mJ/cm$^2$ (integrated amount of light), employing a high-pressure mercury lamp VZero 085 (manufactured by INTEGRATION TECHNOLOGY, Inc.) to cure the ink. Thus, samples 101, 102, 103, 104, 105, 106, 107, 108, 109, 110, 111, 112, 113, 114, 115, 116 and 117 were prepared as prints. However, ink A was not exposed to UV radiation since ink A contained no polymerizable compound.

<Heat-Pressure>

A cylindrical iron cylinder having a diameter of 30 mm (upper roller) and a silicon rubber roller (lower roller) were covered with a tetrafluoroethylene-perfluoroalkylether copolymer, and a surface treatment of the upper roller was adjusted so as to reach 80° C., employing a fixing device in which a heater was installed inside the iron cylinder (upper roller) to conduct a simultaneous heat-pressure treatment at the simultaneous heat-pressure step under the conditions of a transporting speed of 10 mm/s, a line pressure of 8×10$^{-5}$ Pa and a nip width of 4.3 mm in such a way that the upper roller was brought into contact with the surface of an image. In addition, in order to measure the surface treatment of the roller, employed was a non-contact type thermometer (IT-540N, manufactured by HORIBA, Ltd.).

<Heating by Hot-Air>

After printing with the above-described printer, the surface of a print image was subjected to supplying air for 30 seconds after adjusting a distance from a recording medium so as to make the surface of the image to reach 80° C., employing a dryer having a power of 1 kW. In addition, temperature of the surface of an image was measured employing a non-contact type thermometer (IT-540N, manufactured by HORIBA, Ltd.).

<Near-Infrared Radiation>

A line heater having a power of 980 W (HYP-14N, manufactured by HYBC Corporation) was placed at a height of 5 cm from a recording medium, and power of the heater was adjusted so as to make temperature of the image surface to be 80° C. for irradiation for 30 seconds. In addition, temperature of the image surface was measured with a non-contact type thermometer (IT-540N, manufactured by HORIBA, Ltd.).

<Far-Infrared Radiation>

A far-infrared radiation ceramic plate {PLR-120 (1 kW), manufactured by NORITAKE Co., Ltd. } was placed at a height of 5 cm from a recording medium, and power of the heater was adjusted so as to make temperature of the image surface to be 80° C. for irradiation for 30 seconds. In addition, temperature of the image surface was measured with a non-contact type thermometer (IT-540N, manufactured by HORIBA, Ltd.).

Samples each after printing were taken out, and the sample was exposed to microwaves for 30 seconds, employing a microwave oven having a power of 1 kW.

With respect to each ink prepared as described above, print samples were prepared and evaluated in accordance with the following method.

<Gloss Evenness>

Images each in which printing density was continuously varied in the form of a wedge, and gloss evenness thereof was visually observed. Evaluations were made in accordance with the following criteria.

A: gloss evenness is realized over the entire density region.

B: Gloss unevenness is slightly observed in a part of the density region, but at tolerable quality level.

C: Gloss unevenness caused by density is observed, and at an intolerable quality level.

D: Gloss unevenness is observed over the entire density region.

[Evaluation of Wear Resistance]

After printing a solid image on an art paper sheet, the scratching intensity was measured employing a scratching intensity tester HEIDON-18 (manufactured by HEIDON) equipped with a 0.8 mmR sapphire stylus. For the measurement, 10 cm scratching test was carried out 3 times under the condition of constant load, and the limit load at which no scratched portion was present on the recording medium was specified as "scratching intensity" to evaluate wear resistance via the measured values in accordance with the following criteria.

A: A scratching intensity of 250 g or more
   B: A scratching intensity of 200 g or more
   C: A scratching intensity of at least 150 g and less than 200 g
   D: A scratching intensity of at least 100 g and less than 150 g
   E: A scratching intensity of less than 100 g <Liquid Migration>

After a solid image was printed out on an art paper sheet, the situation of liquid migration was visually observed to be designated as an indicator of image density unevenness.

A: No density unevenness is observed at all.
   B: Density unevenness is slightly observed, but a tolerable level.
   C: Density unevenness is generated, and at a problematic quality level.
   D: Density unevenness is largely generated.

As is clear from results shown in Table 1, it is to be understood that sample 101 subjected to no process at all after printing, employing hot-melt ink exhibits poor gloss unevenness and wear resistance. This results in low gloss since hot-melt ink is to be wax as a main component, and no gloss is generated without utilizing a transfer medium. Further, since deposited dots as they are, turn into a gel via decline of temperature, the dots are to be eliminated because of external stress, resulting in decline of wear resistance. In contrast, gloss is slightly improved by changing ink into cationic UV ink, but wear resistance still remains low.

This means that curing is realized via UV radiation, but ink dots remain elevated since the ink dots each have turned into a gel after depositing them by containing a gelling agent therein. Accordingly, for the same reason as described above, low wear resistance results. On the other hand, since both samples 101 and 102 turn into a gel immediately after deposition, no generation of liquid migration is observed.

On the other hand, sample 103 having been subjected to heat-pressure after printing exhibits slightly improved tendency of gloss, and improved wear resistance because of dot flatness-smoothing. In contrast, in the case of sample 104 having been subjected to the same treatment, it presumably deteriorates the flatness-smoothing of a printing portion that the printing portion is transferred onto a fixing portion (offset) via heat-pressure fixing, since an amount of a gelling agent contained in ink after deposition and gelation thereof is small, and gel strength is low.

In the case of sample 105, temperature of ink dots is raised by providing hot-air with a dryer, but at the same time, air is blown to melted dots, whereby shape change thereof is caused, resulting in generation of liquid migration.

In the case of samples 106 and 109, ink dots are melted via application of heat after printing since the ink is hot-melt ink, but it appears that gloss and wear resistance are insufficient since gel strength is high, and it is not possible to realize sufficient flatness-smoothing of the dots only by heating.

It is to be understood that samples 107, 108, 110, 111, 112, 113, 114, 115, 116 and 117 other than those described above, having been subjected to an electromagnetic waves-providing treatment employing cationic UV and radical UV produce the effect of the present invention. Of these, samples 110, 111, 112, 116 and 117 each to be exposed to far-infrared radiation produce a higher effect of the present invention. This presumably means that when heat is applied from the inside of a material by making far-infrared radiation to penetrate inside the material to be heated, ink dots are evenly heated, and flatness-smoothing thereof is improved while maintaining shape of the dot. Further, samples 107 and 108 each having been subjected to heating with a heater, and samples 113 and 114 each having been subjected to a microwaves treatment could produce the same effect as in the case of far-infrared radiation, though the effect was not so high as that of far-infrared radiation.

The invention claimed is:

1. A print preparation method comprising:
    an ejection step in which liquid drops of actinic energy radiation curable type ink-jet ink each containing a polymerizable compound, a photo-polymerizable initiator and a gelling agent are injected from an ink-jet recording head to eject the actinic energy radiation curable type ink-jet ink onto a recording medium, and
    an actinic energy radiation exposure step in which the actinic energy radiation curable type ink-jet ink having been ejected onto the recording medium is exposed actinic energy radiation to form an image,
    wherein the print preparation method further comprises step (A) in which the recording medium is exposed to electromagnetic waves having a longer wavelength than a wavelength of an absorption wavelength of the photo-polymerization initiator contained in the actinic energy radiation curable type ink-jet ink from a side of a surface on which the image is formed, before conducting the actinic energy radiation exposure step.

2. The print preparation method of claim 1,
    wherein the step (A) is conducted after the ejection step.

3. The print preparation method of claim 1,
    wherein the electromagnetic waves comprise far-infrared rays.

4. The print preparation method of claim 1,
    wherein the gelling agent comprises fatty acid ester or ketone wax having a melting point of 40-100° C.

* * * * *